US012234728B2

(12) United States Patent
Tooley et al.

(10) Patent No.: US 12,234,728 B2
(45) Date of Patent: Feb. 25, 2025

(54) HORIZONTAL DIRECTIONAL DRILLING SYSTEM WITH OPERATOR LIFT

(71) Applicant: Vermeer Manufacturing Company, Pella, IA (US)

(72) Inventors: James Brian Tooley, Harvey, IA (US); Jeffrey Dale Langner, Knoxville, IA (US)

(73) Assignee: Vermeer Manufacturing Company, Pella, IA (US)

(*) Notice: Subject to any disclaimer, the term of this patent is extended or adjusted under 35 U.S.C. 154(b) by 441 days.

(21) Appl. No.: 17/604,013

(22) PCT Filed: May 12, 2020

(86) PCT No.: PCT/US2020/032448
§ 371 (c)(1),
(2) Date: Oct. 15, 2021

(87) PCT Pub. No.: WO2020/231978
PCT Pub. Date: Nov. 19, 2020

(65) Prior Publication Data

US 2022/0213734 A1 Jul. 7, 2022

Related U.S. Application Data

(60) Provisional application No. 62/846,827, filed on May 13, 2019.

(51) Int. Cl.
*B67B 3/00* (2006.01)
*B66F 11/04* (2006.01)
(Continued)

(52) U.S. Cl.
CPC ............ *E21B 7/026* (2013.01); *B66F 11/042* (2013.01); *E21B 7/046* (2013.01)

(58) Field of Classification Search
CPC ..... E21B 7/0026; E21B 7/0046; B66F 11/042
See application file for complete search history.

(56) References Cited

U.S. PATENT DOCUMENTS 3,889,778 A 6/1975 Dotts
5,113,969 A * 5/1992 Drolet ...................... E21D 9/12 182/2.11
(Continued)

FOREIGN PATENT DOCUMENTS

CN 106150382 A 11/2016
CN 109630013 A 4/2019
(Continued)

OTHER PUBLICATIONS

International Search Report with Written Opinion for related Application No. PCT/US2020/032448 dated Jul. 6, 2020 (9 Pages).
(Continued)

*Primary Examiner* — Thomas M Wittenschlaeger
*Assistant Examiner* — David G Shutty
(74) *Attorney, Agent, or Firm* — Michael Best & Friedrich LLP

(57) ABSTRACT

A horizontal directional drilling machine includes a frame providing a base, a rack movable to different drilling angles with respect to the base, and a carriage having a rotating assembly for engaging a drill rod, the carriage being movable along the rack to drive the drill rod into the ground. The horizontal directional drilling machine further includes an operator lift including an operator area provided alongside the rack and being adjustable for height with respect to the rack to provide access to the carriage for wireline operations. The operator lift is supported by at least one frame element of the frame.

14 Claims, 10 Drawing Sheets

(51) Int. Cl.

| | |
|---|---|
| *B67C 7/00* | (2006.01) |
| *E21B 7/02* | (2006.01) |
| *E21B 7/04* | (2006.01) |

(56) References Cited

U.S. PATENT DOCUMENTS

| | | | | |
|---|---|---|---|---|
| 5,582,467 | A * | 12/1996 | Drolet | E21B 7/026 299/33 |
| 5,636,711 | A | 6/1997 | Nussbaum | |
| 5,890,737 | A | 4/1999 | Hutka | |
| 6,085,852 | A * | 7/2000 | Sparks | G01M 15/102 414/22.58 |
| 6,179,065 | B1 * | 1/2001 | Payne | E21B 19/15 175/85 |
| 6,439,341 | B1 * | 8/2002 | Engvall | B66F 17/006 182/2.11 |
| 6,460,652 | B1 * | 10/2002 | Piipponen | E21B 7/026 182/2.11 |
| 6,698,371 | B1 | 3/2004 | Stoltzfus | |
| 6,793,024 | B2 * | 9/2004 | Albertson | E21B 7/026 173/184 |
| 6,886,644 | B2 | 5/2005 | Stump et al. | |
| 7,004,285 | B2 * | 2/2006 | Bailey | B66F 11/046 182/2.1 |
| 7,240,742 | B2 * | 7/2007 | Sewell | E21B 7/046 175/85 |
| 7,467,670 | B2 * | 12/2008 | Hartke | E21B 19/14 175/85 |
| 7,493,987 | B2 * | 2/2009 | Puszkiewicz | B66F 17/006 182/69.5 |
| 7,600,584 | B2 * | 10/2009 | Sewell | E21B 7/046 166/85.1 |
| 8,813,909 | B2 * | 8/2014 | Bowden | B66F 11/046 182/18 |
| 9,291,008 | B2 | 3/2016 | Koch et al. | |
| 9,353,573 | B2 * | 5/2016 | Ebersole | E21B 7/022 |
| 9,656,845 | B2 * | 5/2017 | Dittus | B66F 11/044 |
| 9,676,602 | B2 * | 6/2017 | Cummings | B66F 11/046 |
| 9,945,180 | B2 * | 4/2018 | Hartke | E21B 7/046 |
| 10,322,920 | B2 * | 6/2019 | Shi | B66F 17/006 |
| 10,711,520 | B2 * | 7/2020 | Langenfeld | E21B 17/07 |
| 2004/0045768 | A1 * | 3/2004 | Puszkiewicz | B66F 17/006 182/69.5 |
| 2008/0066967 | A1 * | 3/2008 | Rozendaal | E21B 7/024 175/73 |
| 2013/0014992 | A1 | 1/2013 | Sharp et al. | |
| 2018/0313157 | A1 | 11/2018 | Langenfeld et al. | |
| 2018/0313171 | A1 | 11/2018 | Vos et al. | |
| 2018/0362312 | A1 * | 12/2018 | Beji | B66F 9/20 |
| 2019/0010770 | A1 | 1/2019 | Recker et al. | |
| 2020/0317492 | A1 * | 10/2020 | Bhatia | B66F 13/00 |
| 2022/0213734 | A1 * | 7/2022 | Tooley | E21B 7/046 |

FOREIGN PATENT DOCUMENTS

| | | | | |
|---|---|---|---|---|
| EP | 3228581 | A1 * | 10/2017 | |
| GB | 1492735 | A | 11/1977 | |
| GB | 2481709 | A * | 1/2012 | B66F 11/046 |
| WO | WO120117 | A1 | 3/2001 | |
| WO | WO2012042119 | A1 | 4/2012 | |
| WO | WO2020231978 | A1 | 11/2020 | |

OTHER PUBLICATIONS

Trenchlesspedia, “Wireline”, Website: https://www.trenchlesspedia.com/definition/2578/wireline, Last updated Dec. 21, 2018 (10 Pages).

Grundodrill18acs, Now possible with cable guided (wire line) detection system, YouTube Video: https://www.youtube.com/watch?v=qb6fw004lgc, Aug. 14, 2015, (18 Pages).

JLG, “Scissor Lifts: How Variable Tilt Technology Works”, YouTube Video: https://www.youtube.com/watch?v=P8JmxEE3w4s, Mar. 16, 2018, (5 Pages).

Atlas Corp., “Hydraulic Rock Drilling 1977”, YouTube Video: https:/www.youtube.com/watch?v=53DQ02KUmJ0, Posted Jan. 4, 2013 (6 Pages).

Vermeer, “D100x140 Horizontal Directional Drill With Wireline Platform”, publicly used more than one year prior to May 13, 2019, See Statement of Relevance (2 Pages).

North American Energy Pipelines, Pipeline Product Expo, website: https://www.napipelines.com/pipeline-product-expo-7/, Sep. 11, 2014 (5 Pages).

Prime Drilling, PD 500/180 RP HDD Drill Rig, website: https://www.prime-drilling.de/en/anlagen/drill-rigs.html, admitted prior art—published prior to May 13, 2019 (1 Page).

Underground Construction, HDD Rigs: Equipment Spotlight, Sep. 2011, website: https://uconline.com/magazine/2011/september-2011-vol-66-no-9/equipment-spotlight/hdd-rigs-equipment-spotlight, Sep. 2011, (4 Pages).

Underground Construction, American Augers Unveils Large Rapid Setup Rig, Jan. 2015, website: https://uconline.com/magazine/2015/january-2015-vol-70-no-1/new-products/american-augers-unveils-large-rapid-setup-rig, (3 Pages).

* cited by examiner

HORIZONTAL DIRECTIONAL DRILLING SYSTEM WITH OPERATOR LIFT

CROSS-REFERENCE TO RELATED APPLICATIONS

This application claims priority to U.S. Provisional Patent Application No. 62/846,827, filed May 13, 2019, the entire contents of which are incorporated by reference herein.

BACKGROUND

The invention relates to horizontal directional drilling (HDD) systems that are configured to drive a drill rod string into the ground for trenchless underground utility installation. At the end of the drill string is a rotating drilling tool or drill bit.

SUMMARY

In one aspect, the invention provides a horizontal directional drilling machine including a base, a rack movable to different drilling angles with respect to the base, and a carriage having a rotating assembly for engaging a drill rod, the carriage being movable along the rack to drive the drill rod into the ground. The horizontal directional drilling machine further includes an operator lift including an operator area provided alongside the rack and being adjustable for height with respect to the rack to provide access to the carriage for wireline operations. The operator lift is supported by at least one frame element of the horizontal directional drilling machine.

In another aspect, the invention provides a method of installing wireline into a drill rod on a horizontal directional drilling machine. A drill rod is provided on a rack of the horizontal directional drilling machine. A wireline technician is elevated to access an upper end of the drill rod using a movable operator lift supported on a frame element of the horizontal directional drilling machine. From the operator lift, an upper end of a length of wireline that extends through the drill rod is handled and connected to an electrical connector on the horizontal directional drilling machine.

In yet another aspect, the invention provides a horizontal directional drilling machine including a base, a rack movable to different drilling angles with respect to the base, and a carriage having a rotating assembly for engaging a drill rod, the carriage being movable along the rack to drive the drill rod into the ground. The horizontal directional drilling machine further includes an operator lift including an operator area provided alongside the rack and being adjustable for height to provide access to the carriage for wireline operations. The operator lift is not secured to the rack and thus configured for independent movement in order to facilitate connection of a wireline that extends through the drill rod.

DETAILED DESCRIPTION

Figure 1:
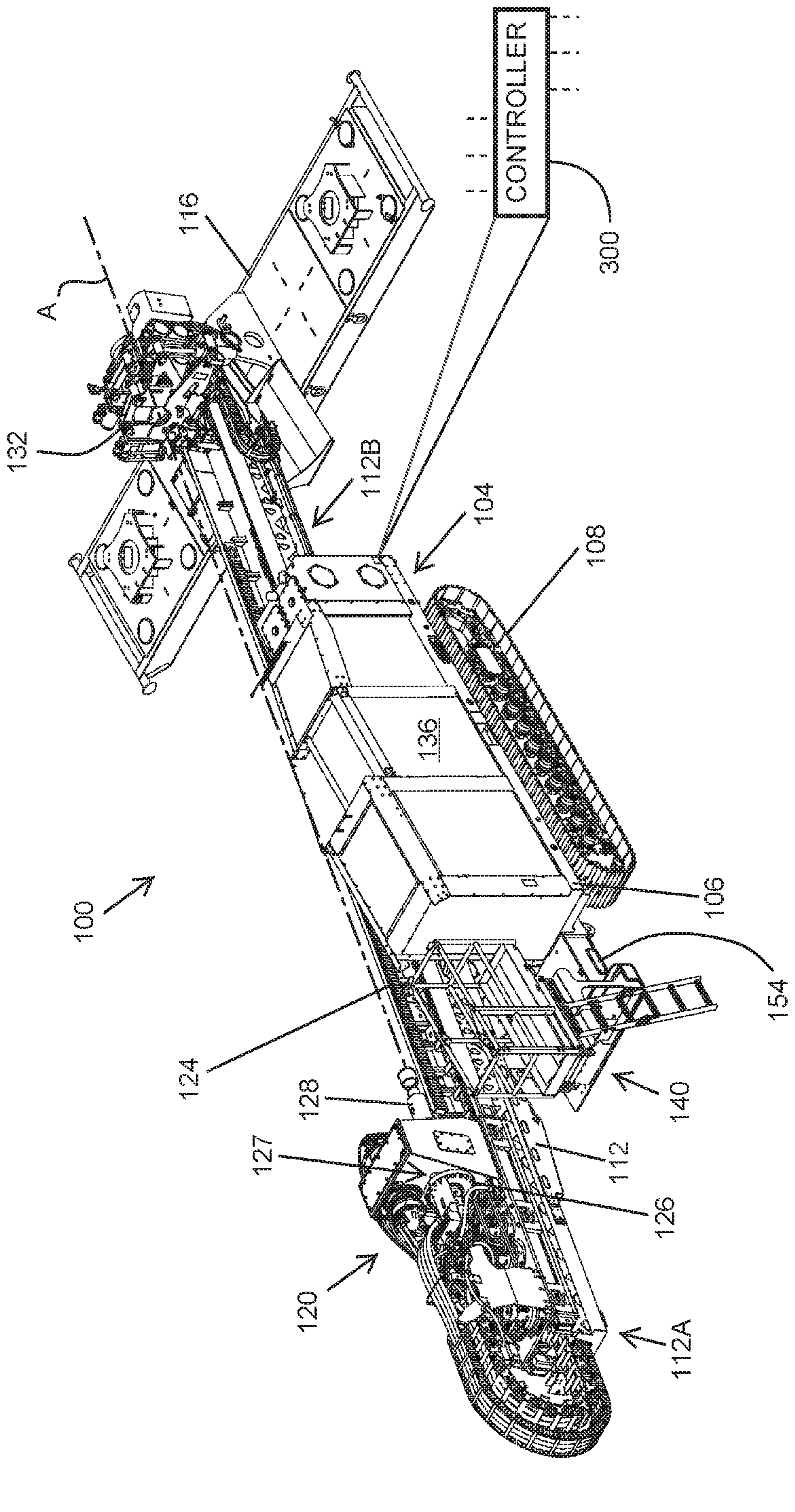
FIG. 1 is a perspective view of a horizontal directional drilling (HDD) machine according to one embodiment of the present disclosure.
Figure 2:
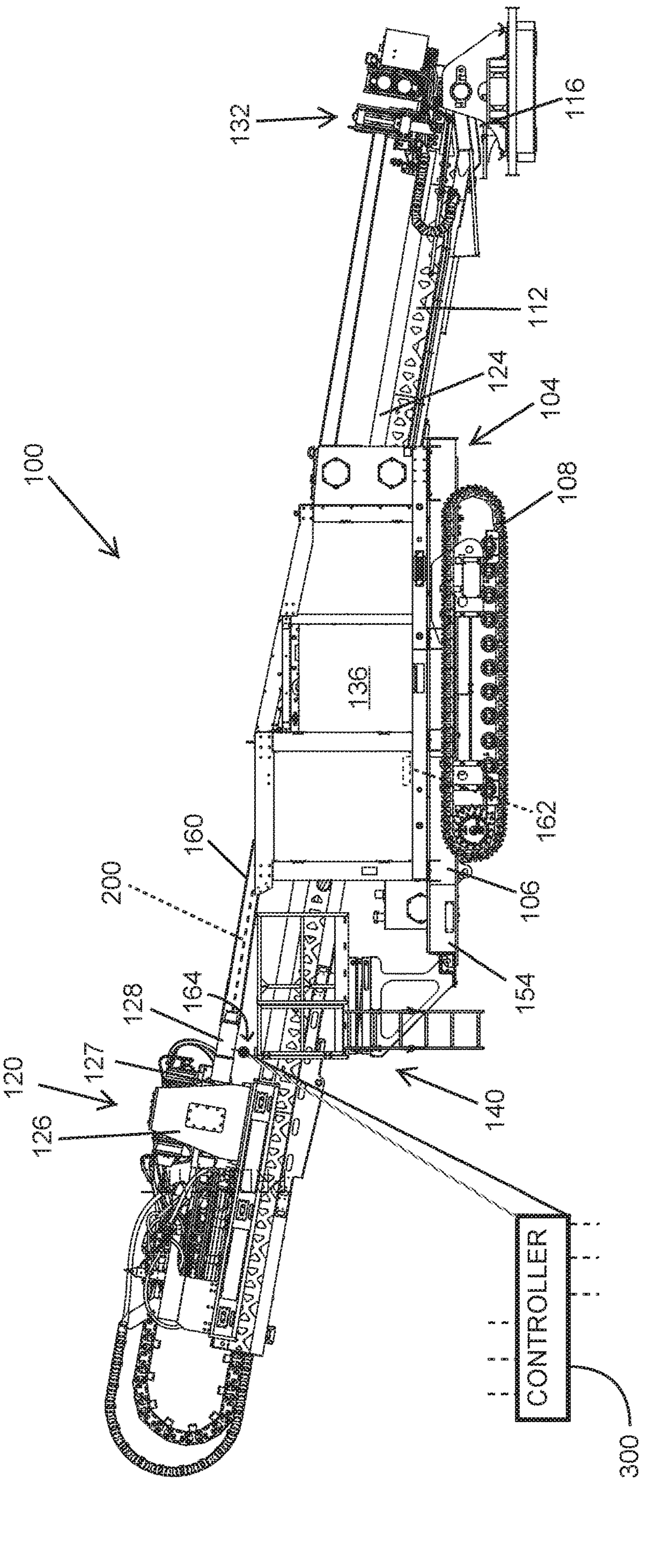
FIG. 2 is a side view of the HDD machine of FIG. 1.

Before any embodiments of the present invention are explained in detail, it is to be understood that the invention is not limited in its application to the details of construction and the arrangement of components set forth in the following description or illustrated in the following drawings. The invention is capable of other embodiments and of being practiced or of being carried out in various ways.

FIGS. 1-8 illustrate a horizontal directional drilling (HDD) machine 100 according to a first illustrated embodiment. The HDD machine 100 is part of a HDD system including a plurality of drill rod assemblies that are sequentially connected end-to-end on the HDD machine 100 to form a drill string. The drill string is driven into the ground by the HDD machine, e.g., for trenchless underground utility installation. At the end of the drill string is a drill head having a rotating drilling tool or drill bit. As discussed further below, the drill head can include electronics (e.g., gyroscopic sensor(s), a data relay receiver, a beacon, a steering mechanism) for tracking and/or steering the drill head underground, and a wireline within the drill string connects the drill head electronics to the HDD machine 100 during operation. The HDD machine 100 includes a base 104 supporting a plurality of mechanical systems operable to assemble and disassemble a drill string and operable to plunge and retract the drill string into and out of the ground in a direction that is at least partially horizontal with respect to the ground. The base 104 can include a main frame 106 and optionally a drive system such as the illustrated tracks 108 configured to move the HDD machine 100 along the ground under its own power, for example powered by an on-board diesel engine or alternative power source. In other constructions, the base 104 is fixed and the frame 106 may be attached to an additional support structure such as a skid or trailer, or alternately a floating structure such as a barge or floating platform. A rack 112 is movably supported on the base 104, particularly on the main frame 106. The rack 112 is an elongate structure defining an axis A that sets the initial drilling direction.

A rear end 112A of the rack 112 is configured to be adjustably elevated above the ground by a lifting mechanism between the base 104, particularly the main frame 106, and the rack 112, such as one or more hydraulic cylinders. A front end 112B of the rack 112 is supported by a ground anchor 116. The ground anchor 116, which can be separate from the frame element(s) forming the main frame 106 in some constructions, constitutes another frame element of the HDD machine 100. The rack 112 supports a carriage 120 and includes a gear rack 124 to enable driving of the carriage 120 along the rack 112. Although not all shown, the carriage 120 includes a plurality of motors, a gearbox 126, and an output pinion engaged with the gear rack 124. One of the plurality of motors, along with the gearbox 126, defines a rotation system 127 of the carriage 120 and of the HDD machine 100 operable to rotate the drill string and/or a single drill rod on the rack 112 about the axis A. In other constructions, the rotation system 127 can be a direct drive system in which a motor drives the output directly, without an intermediate gearbox. A sub saver 128 is supported at a front end of the carriage 120 and forms part of a rotating assembly rotated by the rotation system 127. Adjacent the front end 112B of the rack 112, a fixed or movable break out mechanism 132 (e.g., a vise system) is provided for selectively gripping the upper end of the downhole drill string during attachment with and detachment from the lower end of the on-rack drill rod assembly. After a new drill rod assembly is coupled (to the drill string), the rotation system 127 travels longitudinally on the rack 112 toward the break out mechanism 132, while simultaneously rotating the drill rod assembly, to continue the drilling operation. When the rotation system 127 reaches the break out mechanism 132 at the end of the rack 112, the rotation system 127 is de-coupled from the drill rod assembly and retracted to the rear end 112A of the rack 112 to accommodate the next drill rod assembly. This process is repeated until the drilling operation is complete, and then reversed during a pullback operation in which the HDD machine 100 removes the drill from the ground, one drill rod assembly at a time.

Figure 9:
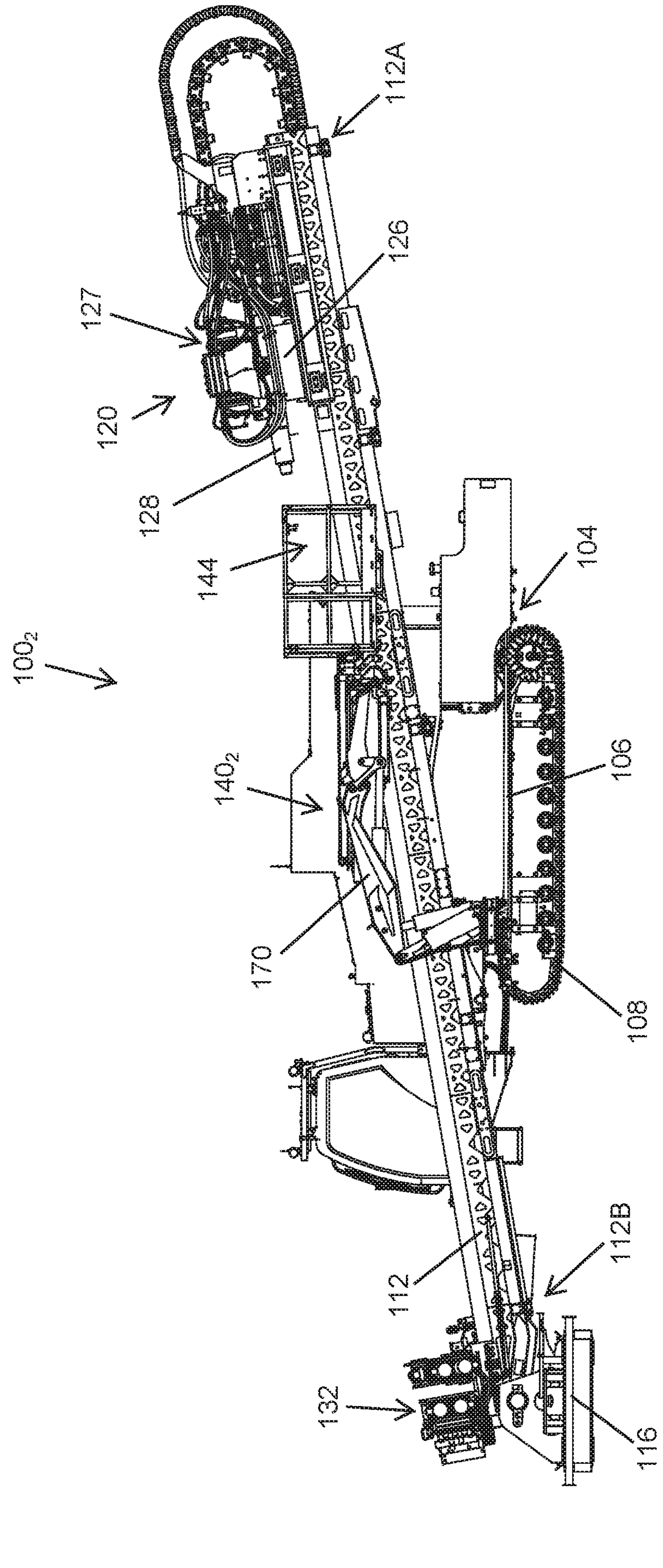
FIG. 9 is a side view of a HDD machine according to a second embodiment of the present disclosure in which an operator lift assembly includes a boom lift.
Figure 10:
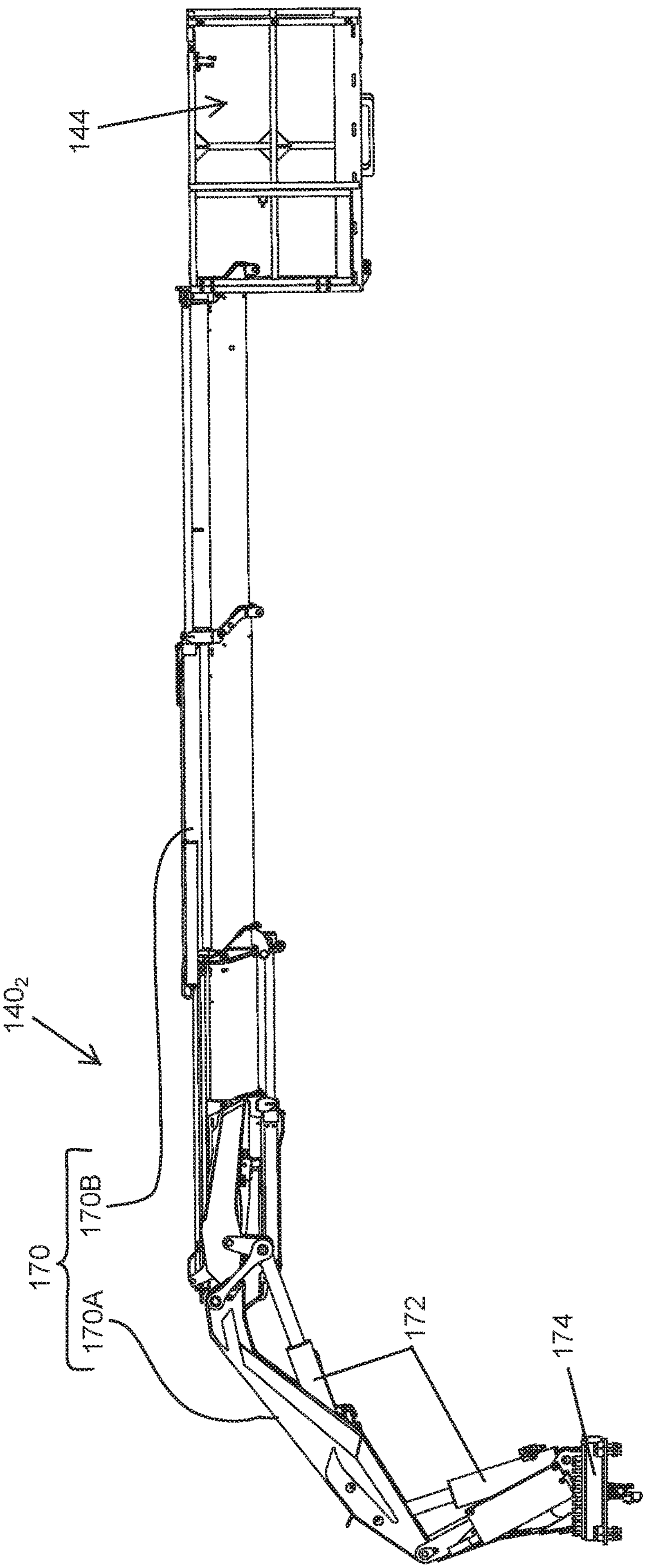
FIG. 10 is a side view of the boom lift of the HDD machine of FIG. 9, shown in an extended position.
Figure 11:
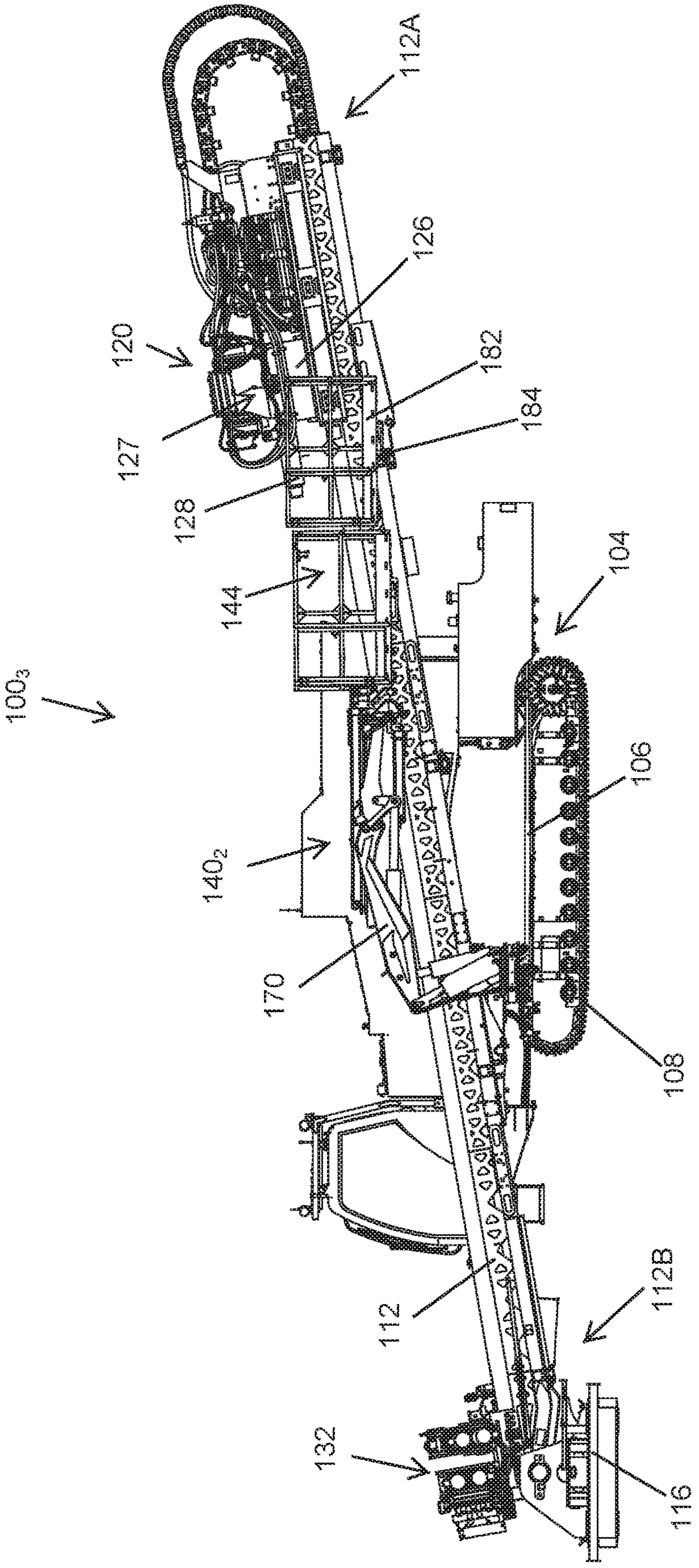
FIG. 11 is a side view of a HDD machine according to a third embodiment of the present disclosure in which an operator lift assembly includes a boom lift, and the HDD machine further includes a carriage-mounted work platform accessible by the operator lift assembly.

Optionally, the HDD machine 100 can include a storage compartment for drill rod assemblies and a fixed operator station (e.g., cabin as shown in FIGS. 9-11) having a seat and controls for manipulation of the HDD machine 100. The cabin can be attached to the HDD machine 100 or provided separately (e.g., as a box positioned near the HDD machine 100 with cords connecting the cabin to the machine). Whether drill rod assemblies are stored on or off the HDD machine 100, a drill rod assembly handling device, such as a crane, an articulating arm, etc. is utilized as part of the HDD system, either on the HDD machine 100 or adjacent thereto. An engine compartment 136 at least partially encloses the diesel engine, a fuel tank, one or more hydraulic motors, pumps, and reservoirs for operating hydraulic implements that move the rack 112 and/or operate grippers in the break out mechanism 132, and a water pump for pumping drilling fluid along the drill string.

Figure 4:
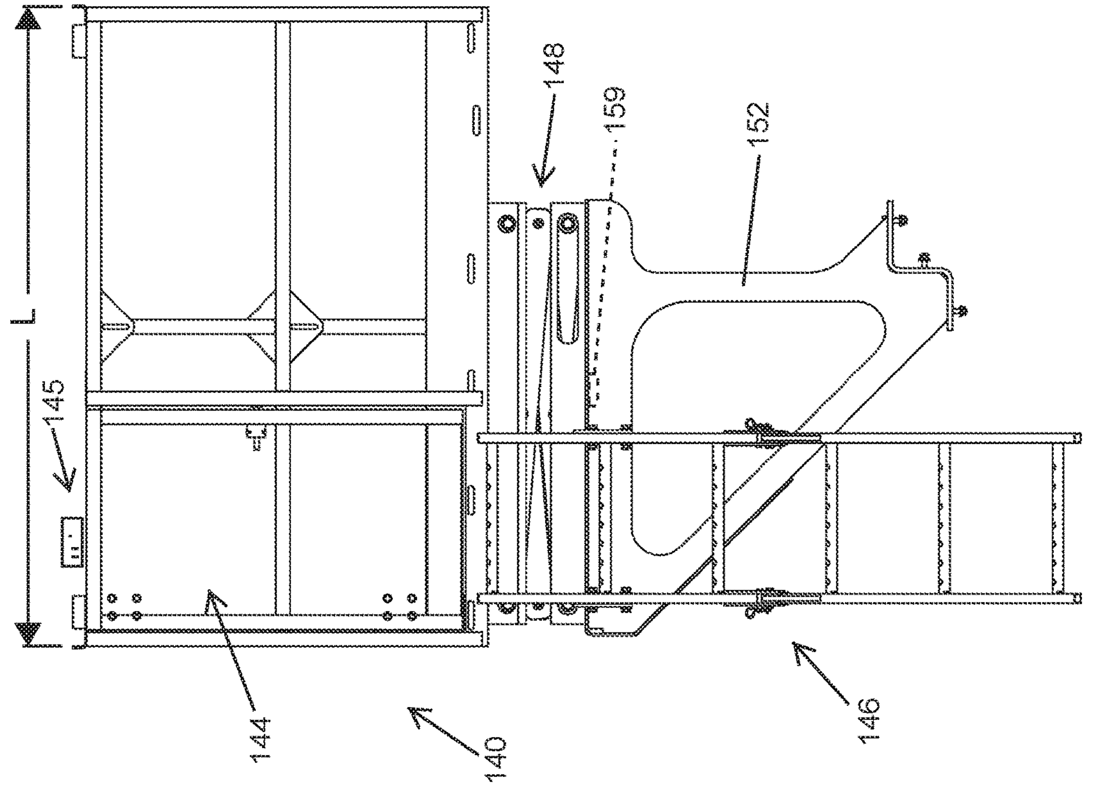
FIG. 4 is a side view of the operator lift assembly of FIG. 3.
Figure 3:
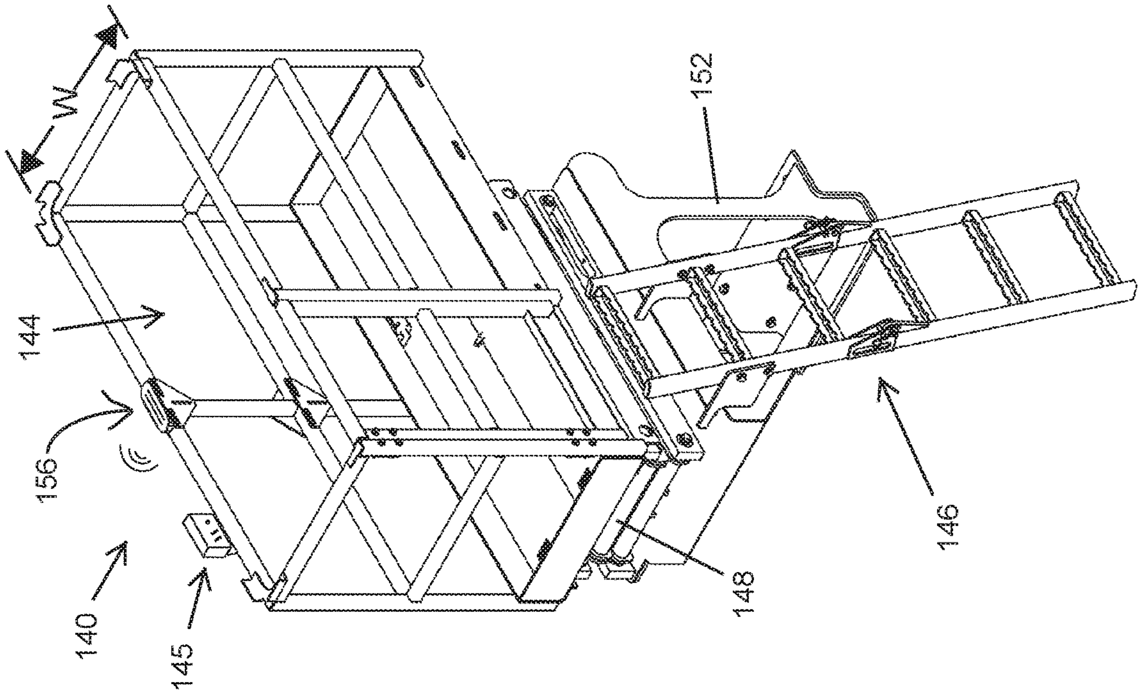
FIG. 3 is a perspective view of an operator lift assembly of the HDD machine of FIGS. 1 and 2.

Rearward of the engine compartment 136, the HDD machine 100 includes an operator lift 140 for supporting an operator (i.e., human technician) above the base 104. The operator lift is not secured to the rack 112, and therefore, the operator lift 140 is operable to move independent of the rack 112. As shown in FIGS. 3-4, the operator lift 140 can include controls 145 within an operator area 144 (e.g., man bucket, cage, or platform) that are configured to raise/lower the lift 140 on the HDD machine 100, and optionally also control one or more implements on the HDD machine 100, including any one or more of: drive of the rotation system 127, output of the diesel engine, movement of the carriage 120 along the rack 112, movement of the rack 112 relative to the base 104, vises or grips within the break out mechanism 132, and rotation of the carriage/drill string. The operator lift 140 can alternately or additionally be controlled by a remote control. In some constructions, the remote control may be docked in a docking station on the operator lift 140.

The operator lift 140 can be positioned alongside the rack 112, with or without a direct connection thereto. The operator lift 140 is shown in further detail in FIGS. 3 and 4, in a retracted or lowermost position. One or more steps provided in the form of a ladder or stairs 146, either fixed or retractable, may provide access to the operator area 144 of the lift 140. The steps may be configured to only provide access to the operator area 144 when the operator lift is in its lowered position (e.g., lowermost). For example, the steps can be supported in position on the main frame 106 and remain in position there while a floor of the operator area 144 may be raised more than 2 feet higher (e.g., up to 4 feet, 6 feet, or more). Although commonly available standalone lifts provide very limited operating ranges, effectively requiring a near flat working surface, the operator lift 140 incorporated into the HDD machine 100 may be required to be operated while on terrain at an incline of up to 10 degrees. As commonly appreciated in the art, a typical self-propelled lift will have inclination limitations such as those disclosed in "JLG® Scissor Lifts: How Variable Tilt Technology Work" at https://www.youtube.com/watch?v=P8JmxEE3w4s (i.e., beyond 1.5 degrees incline, the elevation is limited in steps, and the lift is only operable at all at an inclination of 2.75 degrees or less). While it may be feasible during certain jobs to first prepare a levelled work area for the HDD machine 100, this is often not possible, or economical, and the HDD machine 100 needs to be capable of being operated on a slight hill or incline. Such working conditions would prevent direct incorporation of commonly available lifts and generally leads those of skill in the art away from adding an operator lift to an HDD machine as proposed herein. Because the HDD machine 100 provides a more expansive plan view footprint for the operator lift 140, and includes a vast amount of mass positioned outward of the operator lift 140 (i.e., the majority of the HDD machine mass is outward of the operator lift 140), conventional lift tilt limits are not necessarily suitable.

Figure 5:
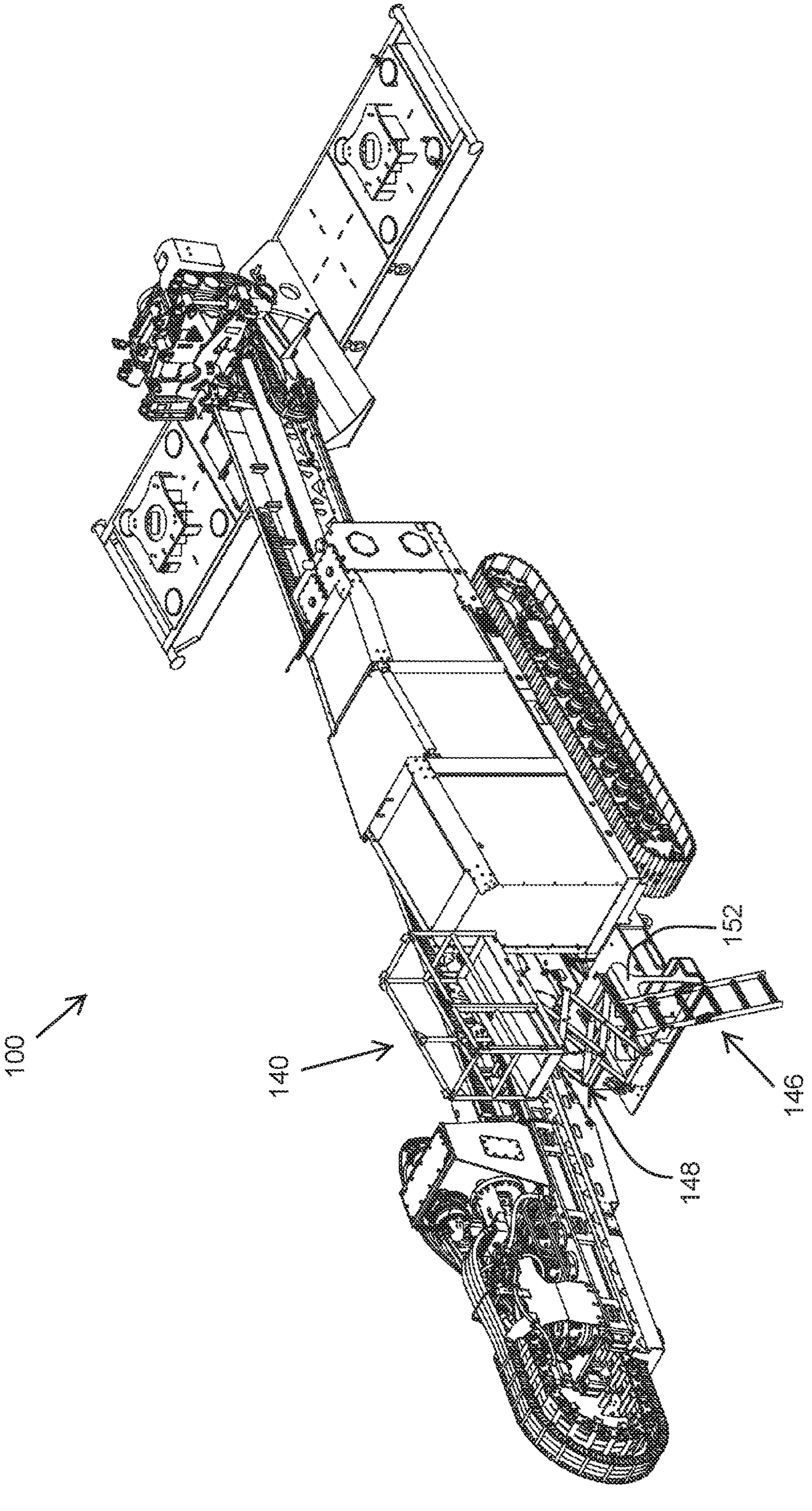
FIG. 5 is a perspective view of the HDD machine of FIGS. 1 and 2, showing the operator lift assembly in a partially raised position.
Figure 6:
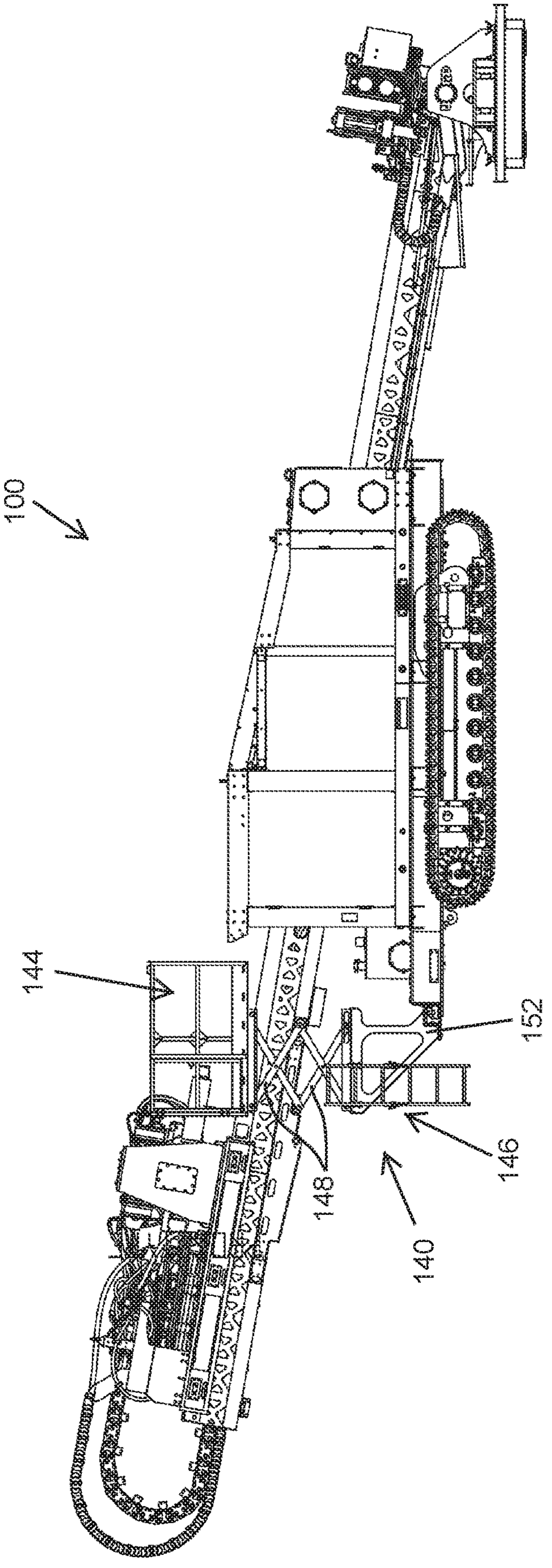
FIG. 6 is a side view of the HDD machine of FIGS. 1 and 2, showing the operator lift assembly in the partially raised position.
Figure 8:
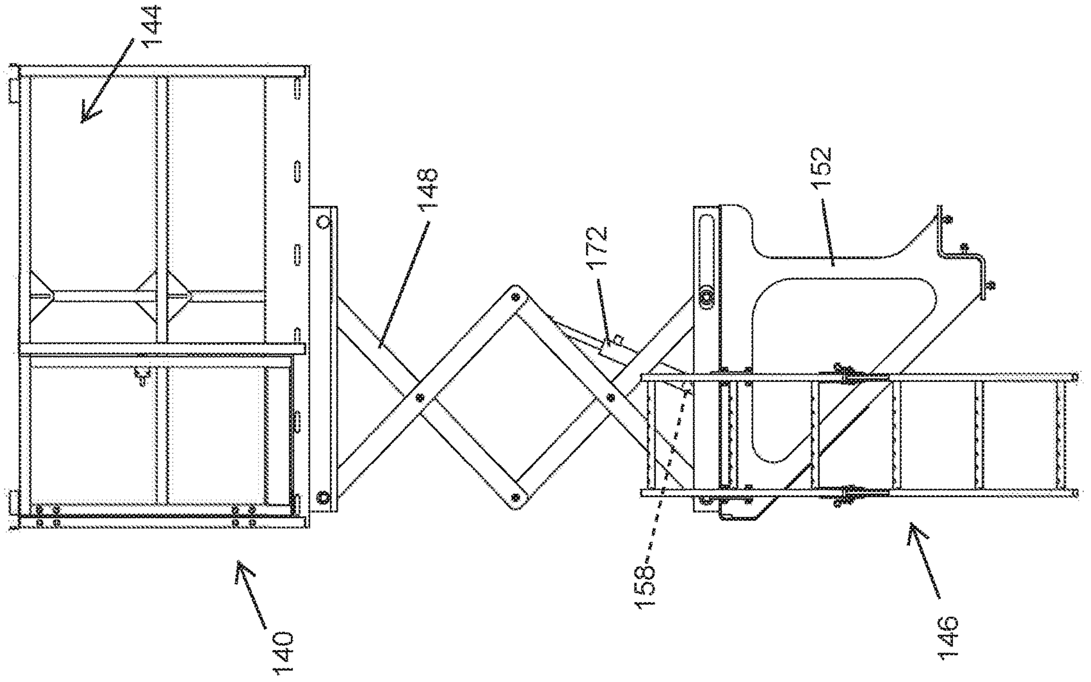
FIG. 8 is a side view of the operator lift assembly in the fully raised position.
Figure 7:
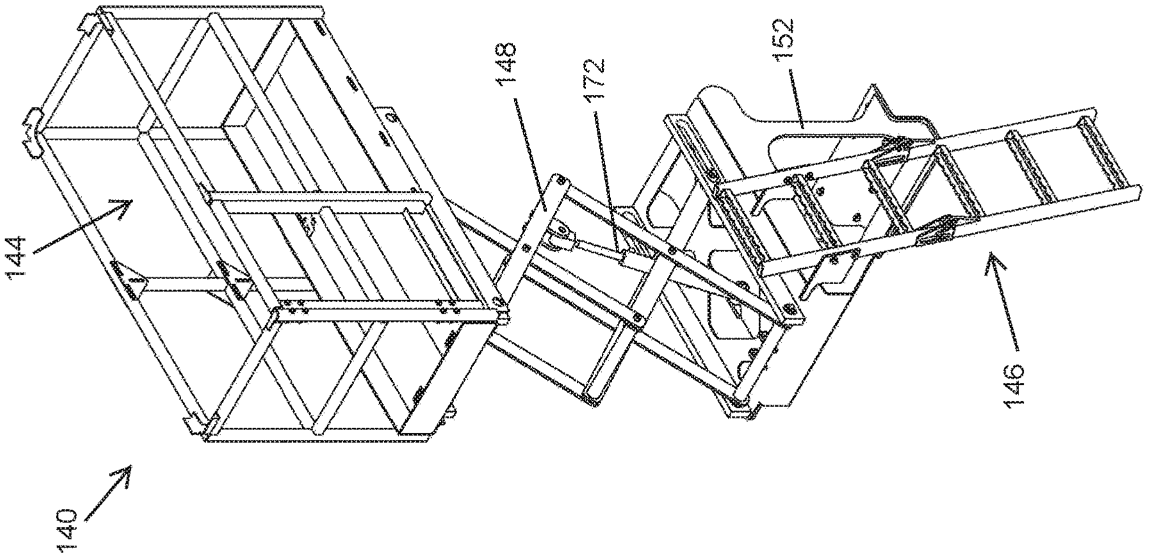
FIG. 7 is a perspective view of the operator lift assembly in a fully raised position.

In some constructions, as illustrated, a longitudinal length L of the operator area 144 is larger than a transverse width W, with the longitudinal direction being parallel to the axis A of the rack 112 when the rack 112 is lowered to horizontal. The operator area 144 can be rectangular in plan view as shown, or may take alternate forms including regular and irregular geometric shapes. As shown, the operator area 144 provides human access adjacent the front end of the carriage 120 at least when the carriage 120 is positioned at the rear end 112A of the rack 112 (or further toward the rear end 112A than the front end 112B) and allows an operator to access the rotation system 127 and/or sub saver 128 from the operator lift 140, especially to access or install the wireline 200 (FIG. 2), regardless of the height or angle setting of the rack 112. Thus, the operator lift 140 is a wireline lift. However the operator lift 140 can be used for inspection, service, or maintenance in some constructions or in some circumstances. The length L of the operator area 144 may be 4 feet, 5 feet, or 6 feet, with longer lengths accommodating variations in drill rod assembly length, which necessitates different starting positions of the carriage 120. The operator lift 140 includes a collapsible scissor lift mechanism 148 that is hydraulically or otherwise driven to expand for raising the height of the operator area 144 (e.g., hydraulic cylinder 172, FIGS. 7 and 8). The operator area 144 may extend horizontally from the scissor lift mechanism 148 farther in one longitudinal direction (e.g., forward) than the other. Likewise, the operator area 144 may extend horizontally from the scissor lift mechanism 148 farther in one widthwise direction than the other. The scissor lift mechanism 148 is supported by a bracket 152 that mounts (e.g., with a plurality of bolted joints) to the frame 106 of the HDD machine 100. In particular, the operator lift bracket 152 is coupled to a rearmost extension of the frame 106, behind the engine compartment 136. The bracket 152 positions the operator lift 140 above a water pump manifold 154 having a water inlet port and a water outlet port. FIGS. 5 and 6 illustrate the operator lift 140 in a partially raised position on the HDD machine 100. FIGS. 7 and 8 illustrate the operator lift 140 in a fully raised position.

Via a controller 300, various operational features of the operator lift 140 described herein may be achieved, alone or in combination. The controller 300 is programmed with various sets of instructions and operates with additional electrically connected hardware to provide a control system. Some exemplary features are described below. An inclinometer 162 can be provided on the HDD machine 100 in some constructions and, if provided, can detect the incline of the HDD machine 100, including with it the operator lift 140. The inclinometer 162 can report a corresponding signal to the controller 300 so that the controller 300 maintains the operator lift 140 in an operable condition exclusively within a prescribed incline range with respect to level ground. The upper limit of the prescribed incline range can be in some constructions, without limit: 3 degrees or more, 6 degrees or more, or up to 8 degrees. Tilt of the HDD machine 100 in excess of the prescribed range may result in a warning indicator being provided to a machine operator. In some constructions, the operator lift 140 automatically stops at a specified location relative to the rack 112 (i.e., specified elevation, unless operator lift has horizontal movement range as in following embodiments). The automatic stop feature can be accomplished by controller logic alone (e.g., with PLC or microprocessor controls, relays, etc.) by taking into consideration the mechanical properties of the operator lift 140 and the current angle of the rack 112. Alternatively or additionally, one or more sensors (e.g., proximity sensor 156) may be used to position the lift 140 correctly, achieving a prescribed height of the operator area working platform relative to the rack 112, by detecting a portion of the rack 112 or the carriage 120 thereon. The sensor(s) used to stop the operator lift 140 can include photoelectric, inductive, magnetic, LIDAR, or biometric, among others. As disclosed, the operator lift 140 is designated for human technician(s) and in some embodiments is not provided for lifting equipment and as such, there may be a suitable weight limit (e.g., less than 1000 lbs, or less than 700 lbs, and in some constructions, the weight limit is 500 lbs) to the function of the operator lift 140, which may be employed utilizing a weight sensor 158 to communicate with the controller 300. The weight sensor 158 can be a load cell or pressure transducer, either incorporated into the working surface atop the lift mechanism or into the lift mechanism itself, such as within the lift cylinder 172 as shown in FIG. 8. Alternatively, the weight limit may be implemented in a passive manner such as a relief valve or counterbalance valve, or simply designing an electrical or hydraulic system to only operate at a specific lifting capacity. Detection of an overweight condition can result in illumination of an indicator light(s) for display to an operator. The weight limit may only be active to limit raising of the operator lift 140, while lowering function is unaffected.

The operator lift 140 can be selectively enabled with an operator interlock/operator presence device to limit operation of the lift 140 when the operator is detected to be engaged and/or detected present. For example, an enable switch is provided and must be maintained in the "on" position to put the lift 140 into an operable state for movement. For example, an up/down switch is only active when the enable switch is held in the on position (e.g., against a bias toward the "off" position). Such controls can be provided at the operator area 144 for the on-board operator and also at the fixed operator station, with the operator area controls having precedence. The operator lift 140 can include one or both of an emergency shut-down switch and a manual over-ride feature to control the lifting device (e.g., controlled descent) in the case of functionality loss, such as a power loss for example. An interlock on an access gate of the operator lift 140 may be enabled to prevent movement of the lift 140 if the gate is open. An interlock can be provided between ground drive of the HDD machine 100 and the lift controls such that if the ground drive is activated, the operator lift 140 is prevent from moving, and vice versa. Movement of the HDD machine 100 along the ground, for example by the drive system and tracks 108, can be prohibited by the control system when the operator lift 140 is raised above its bottom or "transport" position, or a prescribed elevation level. For example, a sensor 159 (with physical detection switch or other electronic detection means) is provided to detect the operator lift 140 in the transport position and report to the controller 300 as a prerequisite for activating the drive system.

In an exemplary method of the present disclosure, an operator (i.e., human worker) occupies the operator area 144 of the operator lift 140, for example via the ladder or stairs 146 when a drill rod 160 is put onto the rack 112 for attachment with the existing drill string. The operator handles a new length of wireline 200, either feeding the new length of wireline 200 down through the drill rod 160 from its upper end or receiving it as it is fed up from the bottom (e.g., via fish tape). The upper end of the newly added wireline 200 is coupled via an electrical connector 164 (e.g., a terminal post, an alligator clip, etc. along with a rotary electrical joint in the form of a swivel or slip ring) to a length of wire on the rack 112 that extends to the controller 300, along with display(s) and control(s) that communicate with the controller 300. In some constructions, the wireline 200 may be threaded through a port in the sub saver 128. Prior to connection of the drill rod 160 at the break out mechanism 132, the operator or another operator splices the lower end of the wireline 200 to the existing wireline that extends through the drill string to the drill head. The splicing can include stripping insulation, crimping of conductive wire or cable, and applying a heat shrink wrap over the splice joint. The operator may lower the operator lift 140 from a raised position adjacent the carriage rotation system 127 and the sub saver 128 to a lowered position and subsequently disembark from the operator area 144 and the operator lift 140 to work on the ground near the break out mechanism 132 to perform the wireline splice operation. A similar method, carried out in reverse, is used during pullback of the drill string for extracting and removing segments of the wireline 200 so that the wireline 200 may remain functional during pullback. Alternately, the entire wireline 200 may be removed prior to pullback.

A conventional lockout switch near the carriage 120 can be switched by the wireline technician to disable rotation of the rotational motor (no rotation of any attached components—chuck, sub saver, drill rod, drill string) and disable movement of the carriage 120 up and down the rack 112 (no thrust or pullback). In alternate constructions, an automatic lockout of any or all of these functions may be triggered in response to detection of the wireline technician in or near the operator area 144, or the operator lift 140 being in a raised position. In some constructions, the control system may provide the drill operator (separate from the wireline technician) with only limited function of the carriage 120 based on the condition of an operator in the operator area 144 and/or the operator lift 140 being raised to a position near the carriage 120. Limited function may include: limited rotation (low torque, low speed—to 'jog' the rotation to facilitate access to wireline components, such as the port on the sub saver 128), and/or limited movement of the carriage 120 up and down the rack (low torque, low speed—to 'jog' the carriage 120 up and down the rack to facilitate access to wireline components). These limited carriage functions may be available via operator controls from the operator area 144 on the operator lift 140 so that they can be controlled by the wireline technician in the operator area 144 to facilitate wireline operations. Such operator controls in the operator area 144 can be restricted controls having limited capability (e.g., limited movement range and/or limited speed) compared to the HDD machine main drilling controls.

The HDD system including the HDD machine 100 is operable with a control system to execute a plurality of software instructions that, when executed by the controller 300, cause the system to implement the methods and otherwise operate and have functionality as described herein. In some examples, the controller 300 is in communication with the diesel engine, the rotation system 127, the rack 112, the break out mechanism 132, electronics in the drill head, the operator's controls/display(s), and/or other components of the system. The controller 300 may comprise a device commonly referred to as a microprocessor, central processing unit (CPU), digital signal processor (DSP), or other similar device, and may be embodied as a standalone unit or as a device shared with components of the system 100, such as the HDD machine 100. The controller 300 may include memory (e.g., RAM and/or ROM) for storing software instructions, or the system may further comprise a separate memory device for storing the software instructions that is electrically connected to the controller 300 for the bi-directional communication of the instructions, data, and signals therebetween. In some examples, the controller 300 waits to receive signals from the operator's controls before communicating with and operating the components of the HDD machine 100. In other examples, the controller 300 can operate autonomously, without receiving signals from the operator's controls, to communicate with and control the operation of the components of the HDD system including the HDD machine 100.

FIGS. 9-12 illustrate HDD machines $\mathbf{100_2}$, $\mathbf{100_3}$, $\mathbf{100_4}$ according to three additional embodiments of the present disclosure, each of which can incorporate the controller 300, the control system, and any or all of the above described features and functions, except where expressly prohibited. As such, the description below focuses on those features of the HDD machines $\mathbf{100_2}$, $\mathbf{100_3}$, $\mathbf{100_4}$ not covered in the preceding description. Each of the HDD machines $\mathbf{100_2}$, $\mathbf{100_3}$, $\mathbf{100_4}$ can provide a portion of a HDD system operable to manipulate drill rods of a drill string for horizontal directional drilling.

As shown in FIGS. 9 and 10, the operator lift $\mathbf{140_2}$ is a boom lift including a boom arm 170 supporting the operator area 144, e.g., at a distal end thereof. The boom arm 170 can be an articulating arm and/or a telescoping-retracting arm. As shown, the boom arm 170 has both an articulating arm portion 170A and a telescoping-retracting arm portion 170B. The boom arm 170 is thusly operable to articulate to assume different shapes and/or extend-retract in length through one or more actuators, which may include one or more hydraulic cylinders 172. A base 174 of the boom arm 170 is pivotably or fixedly coupled to the base 104, and particularly the main frame 106 of the HDD machine $\mathbf{100_2}$. The boom arm 170 extends from its base 174 in a direction away from the ground anchor 116 and toward the rear end 112A of the rack 112. In some construction the boom arm 170 is one of multiple arms supporting the operator area 144 of the operator lift $\mathbf{140_2}$. The boom arm 170 is operated to move relative to the rack 112 to provide operator access to at least the front end of the carriage 120 and the upper end of an on-rack drill rod to carry out wireline installation and/or removal operations as described above. As with the operator lift 140 including the collapsible scissor lift mechanism 148, the operator lift $\mathbf{140_2}$ having the boom arm 170 may lift the operator area 144 with operator automatically to the prescribed working height adjacent the carriage 120, or by manual controls, e.g., within the operator area 144. The operator lift $\mathbf{140_2}$ can be manipulated to place the operator area 144 on or adjacent ground level (e.g., so that an operator support floor is within 18 inches or 12 inches of ground level) to provide ingress and egress for the operator directly from and to the ground adjacent the HDD machine $\mathbf{100_2}$. However, the operator lift $\mathbf{140_2}$ can alternately or additionally be manipulated to place the operator area 144 adjacent a platform either on the HDD machine $\mathbf{100_2}$ or adjacent to it for providing ingress and egress to and from the operator area 144. The operator lift $\mathbf{140_2}$ has a working range that provides the requisite operator access for wireline operations, regardless of the height or angle setting of the rack 112.

FIG. 11 illustrates a HDD machine $\mathbf{100_3}$ that, in addition to the operator boom lift $\mathbf{140_2}$ supporting the operator area 144, includes a separate, rack-mounted operator area 182. The operator area 182 can include a man bucket, cage, or platform. In some constructions, the operator area 182 is positioned in longitudinal alignment with the sub saver 128 and/or at least the front portion of the rotation system 127. As illustrated, the operator area 182 may directly overlap the sub saver 128 and/or at least the front portion of the rotation system 127 in side view. The operator lift $\mathbf{140_2}$ is operated to provide access to the rack-mounted operator area 182, and the operator occupies the rack-mounted operator area 182 to perform wireline operations. One or both of the operator areas 144, 182 can have latching gates providing for operator movement therebetween. In some constructions, the rack-mounted operator area 182 is open on one side and the operator lift $\mathbf{140_2}$ is brought to the open side (e.g., directly adjacent or abutting therewith), and the control system locks out further movement of the operator lift $\mathbf{140_2}$ while the operator occupies the rack-mounted operator area 182. This can be accomplished through weight sensor(s), presence sensor(s), or other suitable means. The operator area 182 can be mounted to the rack 112 directly or indirectly through the carriage 120. The mount can include a pivot 184 for setting a horizontal orientation of the operator area 182 through a range of different operational rack angles. The control system may set the orientation of the operator area 182 automatically in response to setting the rack angle for drilling. Tilt limiters may be provided to physically obstruct tilting beyond a prescribed angle relative to horizontal.

Figure 12:
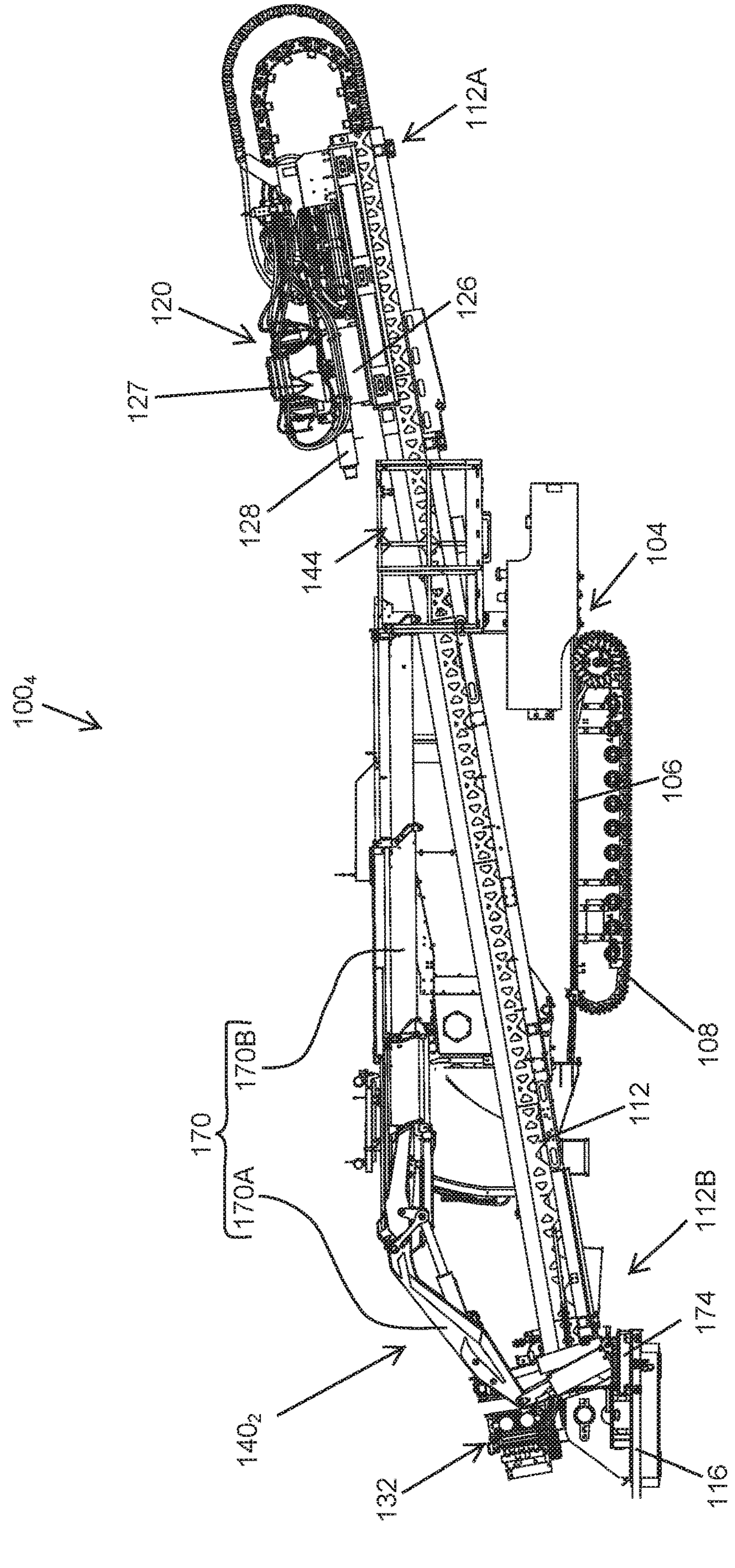
FIG. 12 is a side view of a HDD machine according to a fourth embodiment of the present disclosure in which an operator lift assembly includes a boom lift having a base supported on the ground anchor of the HDD machine.

FIG. 12 illustrates a HDD machine $\mathbf{100_4}$ according to yet another construction, which provides an alternate mounting location for the operator lift 140$_2$ on the HDD machine 100$_4$. Rather than having the boom arm base 174 supported on the main frame 106, the base 174 is supported on the ground anchor 116 to which the front end 112B of the rack 112 is coupled. The operator lift 140$_2$ can have the same construction as one or both of the operator lifts of FIGS. 9-11, or a modified form thereof, for example having an extended reach. As illustrated, the operator area 144 can be mounted so that the distal end of the boom arm 170 is coupled to an upper portion or edge of the operator area 144 rather than a lower portion or edge of the operator area 144 as is shown in FIGS. 9-11. Benefits of mounting the operator lift 140$_2$ on the ground anchor 116 include: simple reconfiguration between being mounted on the left or right side of the HDD machine 100$_4$, the lift does not add to the transport weight, height, or width of the HDD machine 100$_4$, would not add to the transport height or width, the telescoping function of the boom arm 170 allows greater range of motion for positioning the operator, and the operator lift 140$_2$ can move up, down, left, right, or longitudinally up and down the rack 112.

In further constructions, features of the above-described embodiments may be combined, including the provision of more than one operator lift on the HDD machine. In some constructions, the HDD machine supports both an operator lift and a separate lift for handling drill rods (loading onto/unloading from the rack 112). One or both of these may be supported on the ground anchor 116. In other constructions, one or both of such lifts are supported on the main frame 106. It is also conceived that a single lift (e.g., boom lift) may be convertible from a drill rod handler end effector to an operator area and vice versa, or that a single lift may simultaneously provide both a drill rod handler end effector and an operator area. The control system may operate to alter the available functions (e.g., software programming to alter or limit available speed and/or range, lockout of designated equipment or functions) of the lift based on the configuration as a drill rod handler versus an operator lift. One such scenario is that operation of the lift by remote control, which is used for drill rod handling, can be disabled when configured or used as an operator lift. The various operator lifts disclosed herein may be positioned on either the right hand side or the left side of the rack 112. In some constructions, the operator lift is removably attached (e.g., with bolted joints or other removable fasteners, rather than being permanently affixed by welding or other means). Furthermore, the operator lift may be supported on the HDD machine with a folding mechanism to put the lift into a non-operational stowed position (e.g., under the rack 112) for transport of the HDD machine.

Changes may be made in the above methods and systems without departing from the scope hereof. It should thus be noted that the matter contained in the above description or shown in the accompanying drawings should be interpreted as illustrative and not in a limiting sense. The following claims are intended to cover all generic and specific features described herein, as well as all statements of the scope of the present method and system, which, as a matter of language, might be said to fall therebetween.

What is claimed is:

1. A horizontal directional drilling machine comprising:
a frame;
a rack having a front end supported by a ground anchor and a rear end movable to different elevations above a ground;
a carriage having a rotating assembly for engaging a drill rod, the carriage being movable along the rack to drive the drill rod into the ground; and
an operator lift including an operator platform provided alongside the rack and being elevation adjustable with respect to the rack to provide access to a front end of the carriage for wireline operations with the carriage positioned toward the rear end of the rack, wherein the operator lift is mounted to the frame,
wherein a control system interlock is configured to prevent concurrent operation of a ground drive of the horizontal directional drilling machine and a set of lift controls that control the elevation of the operator lift.

2. The horizontal directional drilling machine of claim 1, wherein the operator lift is adjustable for height by one or more height controls of the horizontal directional drilling machine.

3. The horizontal directional drilling machine of claim 2, wherein the one or more height controls are provided separately from drilling controls of the horizontal directional drilling machine.

4. The horizontal directional drilling machine of claim 1, wherein a lifting mechanism of the operator lift includes a collapsible scissor lift mechanism.

5. The horizontal directional drilling machine of claim 4, wherein the operator platform is positioned atop the scissor lift mechanism and extends farther beyond the scissor lift mechanism in one longitudinal direction of the rack than in the other longitudinal direction of the rack.

6. The horizontal directional drilling machine of claim 1, further comprising an electronic control system including a weight sensor, the electronic control system providing a weight limit function of the operator lift.

7. The horizontal directional drilling machine of claim 1, wherein the horizontal directional drilling machine further comprises is a tilt limit to the function of the operator lift.

8. The horizontal directional drilling machine of claim 1, further comprising an electronic control system, wherein operation of the operator lift by the electronic control system is restricted by an operator interlock or an operator presence device.

9. The horizontal directional drilling machine of claim 1, wherein the operator platform of the operator lift includes an access gate, and wherein a control system interlock is configured to prevent movement of the operator lift when the access gate is open.

10. The horizontal directional drilling machine of claim 1, further comprising lift controls having an interlock, wherein operating conditions of the horizontal directional drilling machine affect the operator lift.

11. The horizontal directional drilling machine of claim 10, wherein the horizontal directional drilling machine has a tilt sensor and the interlock prevents operation of the operator lift if the horizontal directional drilling machine is tilted beyond a prescribed angle.

12. The horizontal directional drilling machine of claim 10, wherein the operator lift has an interlock device on an access gate and the lift controls allow the operator lift to move to a position adjacent the carriage, and the interlock device enables the operator lift to move as long as the access gate remains closed.

13. A horizontal directional drilling machine comprising:
a frame;
a rack having a front end supported by a ground anchor and a rear end movable to different elevations above a ground;

a carriage having a rotating assembly for engaging a drill rod, the carriage being movable along the rack to drive the drill rod into the ground;

an operator lift including an operator platform provided alongside the rack and being elevation adjustable with respect to the rack to provide access to a front end of the carriage for wireline operations with the carriage positioned toward the rear end of the rack, wherein the operator lift is mounted to the frame;

a drive system for moving the horizontal directional drilling machine along the ground; and a control system having a sensor for detecting that the operator platform is in a lowered transport position, wherein the control system includes an interlock between the drive system and a set of lift controls such that if the drive system is activated, the operator lift is prevented from moving the operator platform, and if the operator platform is not in the lowered transport position, the drive system is prevented from moving the horizontal directional drilling machine.

14. A method of installing wireline into a drill rod on a horizontal directional drilling machine, the method comprising:

providing a drill rod on a rack of the horizontal directional drilling machine;

elevating a wireline technician to access an upper end of the drill rod using a movable operator lift supported on a frame of the horizontal directional drilling machine; and from the operator lift, handling an upper end of a length of wireline that extends through the drill rod, and connecting the upper end of the length of wireline to an electrical connector on the horizontal directional drilling machine.

* * * * *